Figure 1:
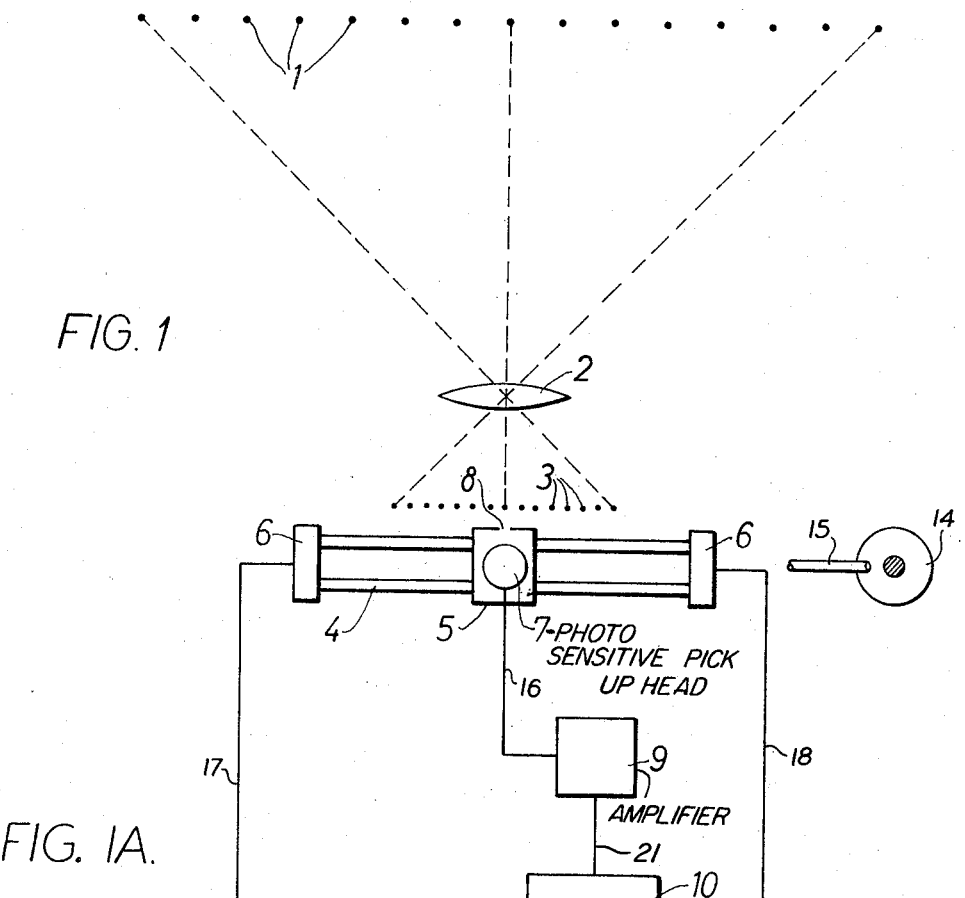

Feb. 21, 1967  B. VINZELBERG ETAL  3,305,687
APPARATUS FOR PHOTOELECTRIC INSPECTION OF RUNNING THREADS
Filed April 16, 1963  2 Sheets-Sheet 2

INVENTORS:
BERNHARD VINZELBERG, KONRAD BUNGE, OTTO KOCH,
FRIEDRICH LINSERT, WILHELM HAGER.
BY
Burgess, Dinklage & Sprung
ATTORNEY

United States Patent Office 3,305,687
Patented Feb. 21, 1967

3,305,687
APPARATUS FOR PHOTOELECTRIC INSPECTION OF RUNNING THREADS
Bernhard Vinzelberg, Leverkusen, Konrad Bunge and Otto Koch, Cologne-Stammheim, and Friedrich Linsert and Wilhelm Hager, Dormagen, Germany, assignors to Farbenfabriken Bayer Aktiengesellschaft, Leverkusen, Germany, a corporation of Germany
Filed Apr. 16, 1963, Ser. No. 273,368
Claims priority, application Germany, Nov. 7, 1959, F 29,799
4 Claims. (Cl. 250—219)

This application is a continuation-in-part of application Serial No. 66,825, filed November 2, 1960, now abandoned.

The invention relates to an apparatus for the continuous photoelectric inspection of arrays of running threads in spinning and textile machines, especially in continuous spinning frames, to detect broken or doubled threads.

Systems for the inspection of thread arrays in textile machines are known, in which mechanical thread sentinels of many different types associated with each thread cause an alarm circuit to be closed when thread breakage occurs, either by mechanical means (German Patent 921,895) or by photoelectrical means (U.S. Patents 2,233,483 and 2,389,625). The disadvantage of such systems consists in the great number of mechanical or photoelectrical detectors needed.

Furthermore, thread breakage detecting systems are known in which the broken thread in falling causes an alarm circuit to close, either by virtue of its conductivity or by the interruption of a light beam (German periodical, "Textil-Praxis," September 1957, pp. 894–895, Author, R. Valentin). The disadvantages of such systems lies in the fact that doubled threads, which lack the loose or broken thread end for the actuation of the alarm circuit, cannot be indicated.

It has also been proposed to sense optically produced images of the thread array by photoelectric means. For example, in the knitwear industry, changes in light intensity produced by thread breakage are used to shut off the machine (German periodical "Textil-Praxis," September 1957, page 895, Author, R. Valentin). The inspection of running arrays of threads with these arrangements is impossible, however, since they require that the luminous intensity of the overall image be measured.

Systems for photoelectric thread inspection are also known in which a reflective detector is used which is periodically moved transversely of the thread array (German Patent 892,429). The light reaching the photocell is in this case masked off by a diaphragm to a width that is greater than the maximum distance between two threads and smaller than the minimum interval covered by three threads. Since such systems necessitate a precisely measured, ever constant thread spacing, they have not proven effective, and they are ineffectual when a gap is intentionally created in the array for production reasons.

In contrast to this system, which can detect a local flaw only if the thread spacing is constant, and which, furthermore, is unreliable when the threads are not round in cross-section but rather are, for example, in the form of bands, in the apparatus of the invention it makes no difference whether the threads are arrayed in a plurality of clusters varying in thread size and spacing, or in groups of arrays separated from one another by great distances, or in long ranks, uniformly spaced and composed of identical threads.

Photoelectric inspection systems used on individual threads drawn from cops, for example, such as thread diameter control systems or systems for determining the nature of the thread in a mixing operation, or systems for the inspection of finished textile products, are unsuitable for the inspection of arrays of running threads, and do not permit of application to continuous spinning frames and of adaptation to the conditions prevailing in such machines.

The invention relates to an apparatus for the continuous photoelectric inspection of running thread arrays in spinning and textile machines, especially continuous spinning frames, in which a reduced image of the thread array, produced by a lens, can be scanned by a pickup head moving periodically across the said image. Within the pickup head there is disposed a photoelectric element (photocell, photodiode, phototransistor or multiplier) which receives the light reflected from each thread and converts it into electrical impulses, which in turn can be counted by means of an electronic impulse counting system, such as a three decade impulse counting system. By electronic means, e.g. by means of a comparison circuit or by voltage comparison, etc., (German periodical "Elektronik," Munich, August 1959, pages 255–256) the total impulses counted during each movement of the pickup head are compared with the preset standard number, and an alarm signal (e.g. a light or horn) is actuated if the number of threads differs from the standard.

As it is already known from inspection and control systems of the prior art (German periodical "Textil-Praxis," September 1957, page 895, Author, R. Valentin), the alarm system can be controlled, by means of a storage system, for example, so that it is not actuated until the number of threads differs from the standard twice or more times in successive counts.

The apparatus of the invention comprises sensing means including a photosensitive means and slit means for exposing the photosensitive means to the threads one at a time. The apparatus further includes sweep means for movement of the sensing means to sweep the threads in an array thereof wherein the threads are spaced and do not cross for successively exposing the photosensitive means to each of the successive threads in the array. The sweeping motion can be provided by moving the sensing means including the photosensitive means and the slit means. Alternatively, this sweeping motion can be provided by merely moving the slit means to provide the desired exposure. Also included in the apparatus are counting means which are operatively connected to the sensing means and are responsive thereto for totaling exposures of the sensing means to the threads during a sweeping of the array, and indicating means for response to the counting means and indicating the count for a sweep of the array. The counting means and the indicating means are interconnected for transmission of the count for a sweep of the array from the counting means to the indicating means.

The indicating means can include a comparer for comparing the total count of the counting means for a sweep of the array and a preselected value, and the indicating means can further include signal means operatively connected to the comparer and responsive thereto for indicating deviation of the total from the preselected value. The indication can be by way of a signal as is obtainable with a light or horn. Where the count is the same as the preselected value, as would be the case when no threads are broken and there are no double threads in the array, the response of the indicating means to the counting means would be zero and signaling means would not be operated.

The apparatus of the invention can be outfitted so that the sweep means is adapted to provide movement of the sensing means to successively sweep the array as described above, and, in such embodiments, the apparatus can include zeroing means for cancelling the count of the counting means intermediate each sweep of the array and following transmission of the count for a sweep of the array from the counting means to the indicating means.

The exposing of the photosensitive means to the threads can be by direct exposure or by exposure of the photosensitive means to thread images provided by an optical system interposed between the thread array and the sensing means. The optical system can be utilized to provide the threads as a reduced size image.

Figure 2:
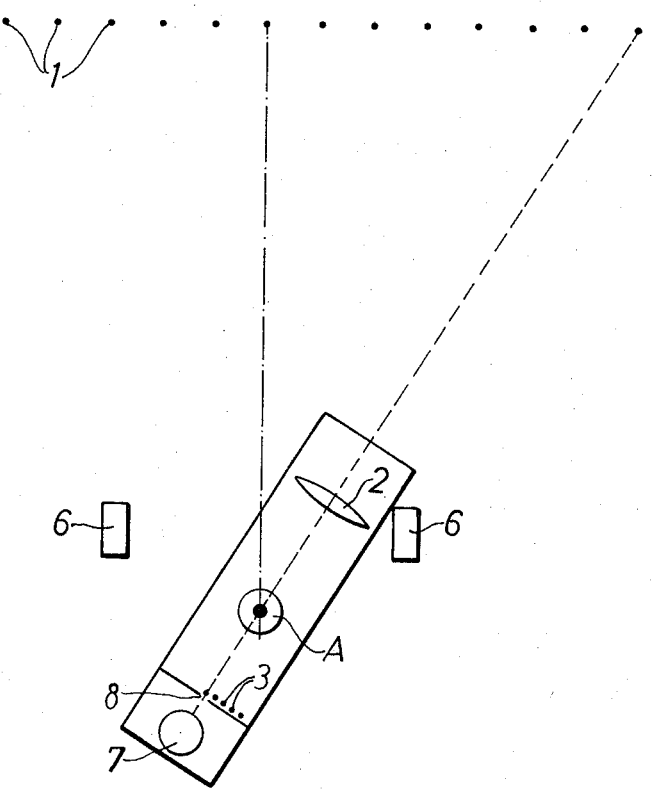

Specific embodiments of apparatus according to the invention are described in reference to the accompanying drawings, wherein:

FIG. 1 shown schematically a scanning and counting system of the invention;

FIG. 1a indicates schematically, in more detail, the operation of parts of the apparatus shown in FIG. 1; and FIG. 2 indicates schematically a modified form of apparatus according to the invention.

In the various views of the drawings, like reference characters indicate corresponding parts.

In FIG. 1, 1 represents the individual threads of the array, which can be kept constantly spaced by a comb or notched guide (not shown). If necessary, to increase the resolving power, the thread array can be illuminated by an illuminating device mounted in a manner to suitably illuminate the threads. Over or under the thread array there is mounted a stationary optical system 2, which produces a reduced image 3 of the thread array. Guide rails 4 and a carriage 5 lie perpendicular to the direction of movement of the threads and parallel to the plane of thread array image 3. The carriage is reciprocated back and forth over the track 4 by the eccentric drive 14 which is connected to the carriage by connection rod 15, and upon the carriage reaching either of the reversal points, it operates the end contacts 6 which serve to sense arrivals of the carriage at its reversal points. Mechanical contacts or other suitable means can be used in this service. The carriage 5 bears the pickup head 7 (photocell, multiplier, etc.).

The pickup head 7 is provided with a slit system 8 of such dimension that the pickup head 7 can see but one thread at a time. The pickup head 7 works through an amplifier 9 upon an electronic impulse counting apparatus 10 provided with a number presetting system. The pickup head 7 and amplifier 9 are interconnected by wire 16 and the amplifier 9 and counting apparatus 10 by wire 21. The system 10, whose modes of embodiment are known, is connected with the alarm system 11 (horn or light) which is actuated by means of a comparison circuit only when there is a difference between the number of threads and the standard number. An example of a comparison circuit suitable for use in system 10 is described in the German periodical, "Elektronik," Munich, No. 8, 1959, pages 255 and 256. When the end contacts 6 are actuated, they operate sequentially in order first to operate the comparison circuit, and then to clear the counting system 10, i.e., to reset it to zero. The contacts 6 are connected to the system 10 by wires 17 and 18.

The layout is such that, when carriage 5 is running, the images of the individual threads pass successively through the slit system 8, while the impulses emitted by the pickup head as the latter sense the brightness of these images are counted by the counting mechanism 10, and correspond to the number of threads present. The scanning time can be varied by varying the linear velocity of the carriage 5.

Let us say that the moving thread array in a spinning frame consists of 412 individual threads. This number is entered into the electronic impulse counting mechanism 10 through the preselecting device contained in the same, which directly controls the digits in each column or decade. If a thread breaks or if two threads have run together, only 411 impulses are fed to the counting apparatus 10 during the movement of the pickup head 7. At one of the end points of the carriage travel, the end contact 6 goes through a cycle in which it first starts the comparison of the counted number with the preset number, and since the present number is not reached it trips the alarm system 11, and then, after a slight delay, it clears the counting mechanism 10 back to zero.

If there are no broken threads, or double threads, no alarm is sounded since the counted number and the preset number are the same. Counter 10 is merely cleared by one of the limit switches 6, and thus is prepared for the next count.

The system 10 is further indicated in FIG. 1a, wherein it is shown as composed of the counter 19 and the indicator 20. Signals received from the contacts 6 by the counter 19 serve to interrupt the counting, cause transmission of a signal to the indicator 20, and to zero the counter for the next sweep by the pickup head 7.

FIG. 2 shows an embodiment in which the lens 2 for the production of the reduced image 3 of the thread array 1 is grouped together with the pickup head 7 and its slit system 8 into a unit which is disposed so as to swing or rotate about point A. In this embodiment, the optical system is movable in correspondence with the movement of the pick up head in its sweeping of the images. The movement of this unit is produced, for example, by an appropriately machined heart cam and a motor drive (not shown). At the points of reversal of the oscillating unit, the latter operates the limit switches 6. The counting apparatus, which is not represented in this figure, is the same as the one in FIG. 1.

What is claimed is:

1. Apparatus for continuous photoelectrical inspection of spaced running threads in spinning and textile machines, comprising:
   (a) optical means for producing a reduced image of the running threads;
   (b) sensing means including a photosensitive means and slit means for exposing the photosensitive means to the thread images one at a time, said photosensitive means absorbing light reflected by each thread and converting it into electrical impulses;
   (c) sweep means for movement of the sensing means to sweep said reduced images of the threads for successively exposing the photosensitive means to each of the successive thread images;
   (d) counting means operatively connected to the sensing means and responsive thereto for totaling exposures of the sensing means to the thread images during a sweeping of the reduced image, and effective to issue a signal upon deviation of the number of thread images counted during a sweeping of the reduced image and a preselected number;
   (e) indicating means responsive to said signal of the counting means and indicating occurrence of said deviation;
   (f) means for resetting the counting means to zero following each sweep of the thread image by the sweep means.

2. Apparatus according to claim 1, the optical means being fixedly positioned relative to the sweep means.

3. Apparatus for continuous photoelectrical inspection of spaced running threads in spinning and textile machines, comprising:
   (a) optical means for producing a reduced image of each of the running threads;
   (b) sensing means including a photosensitive means and slit means for exposing the photosensitive means to the thread images one at a time, said photosensitive means absorbing light reflected by each thread and converting it into electrical impulses;
   (c) sweep means for movement of the sensing means and the optical means to sweep the running threads to provide successive reduced images of each of the threads for successively exposing the photosensitive means to each of the successive thread images;

(d) counting means operatively connected to the sensing means and responsive thereto for totaling exposures of the sensing means to the thread images during a sweeping of the reduced images, and effective to issue a signal upon deviation of the number of thread images counted during a sweeping of the reduced images and a preselected number;

(e) indicating means responsive to said signal of the counting means and indicating occurrence of said deviation;

(f) means for resetting the counting means to zero following each sweep of the thread images by the sweep means.

4. Apparatus according to claim 1, the optical means being mounted for movement in correspondence with the movement of the sweep means and providing an image of the successive threads for the sensing means.

References Cited by the Examiner

UNITED STATES PATENTS

| | | | |
|---|---|---|---|
| 2,859,603 | 11/1958 | Edelman et al. | 88—14 X |
| 2,919,624 | 1/1960 | Lindemann et al. | 88—14 |
| 2,938,666 | 5/1960 | Rand | 250—227 X |
| 3,074,631 | 1/1963 | Buysch | 325—92 |

OTHER REFERENCES

Wild: Electronics, March 1947, pp. 120–123, 250–223.

RALPH G. NILSON, *Primary Examiner.*

WALTER STOLWEIN, *Examiner.*

UNITED STATES PATENT OFFICE
CERTIFICATE OF CORRECTION

Patent No. 3,305,687 February 21, 1967

Bernhard Vinzelberg et al.

It is hereby certified that error appears in the above numbered patent requiring correction and that the said Letters Patent should read as corrected below.

Column 6, line 10, for "325-92" read -- 235-92 --.

Signed and sealed this 7th day of November 1967.

(SEAL)
Attest:

Edward M. Fletcher, Jr.

Attesting Officer

EDWARD J. BRENNER

Commissioner of Patents